Patented Dec. 7, 1937

2,101,642

UNITED STATES PATENT OFFICE 2,101,642

MOLDING COMPOSITION

Ernst Elbel and Fritz Seebach, Erkner, near Berlin, Germany, assignors to Bakelite Corporation, New York, N. Y., a corporation of Delaware No Drawing. Application September 28, 1933, Serial No. 691,355. In Germany October 8, 1932

6 Claims. (Cl. 106—22)

In the manufacture of molding compositions it is known to use artificial resins, especially phenol-aldehyde resins, capable of being hardened when heated. As is known molding compositions can also be prepared from resins, for instance from phenols and aldehydes, preferably formaldehyde, which are not capable of being hardened solely by heating, but which in addition require to be treated by a particular hardening agent, for instance, hexamethylenetetramine, to accomplish this purpose. The last named artificial resin binders have been used to an ever increasing extent, because, during their being treated by simultaneously applying pressure and heat in a hot-molding press, the molding material produced therefrom acquires a perfect flowing property, necessitates a very short molding operation, and in its finished state, becomes extremely hard.

On applying the phenol-aldehyde resins (novolaks) in admixture with hexamethylene-tetramine, or on applying the resols mixed with hardening accelerators containing ammonia, for instance, hexamethylenetetramine, free ammonia is formed during the hardening by heating. In the former instance, the methylene groups of the hardening agent react upon the resin, while the ammonia contained in the hexamethylenetetramine becomes free and remains in the molded article. A similar result is obtained on using resols in admixture with hexa or the like. However, the ammonia has the tendency to gradually escape from the molded product, which requires some time, the last portion of the ammonia not escaping at all. The fact that such molded products gives off ammonia even in small quantities for a considerable length of time, has been found to be inconvenient. Such liberation of ammonia may directly be noticed if a molded article, for instance, a box, is opened so as to determine the smell of ammonia within. These conditions are, of course, rather unpleasant in the case of moldings to be used as food containers, as the average food is extremely susceptible even to the least odors.

We have now observed that it is possible to produce an odorless finished article, if, in accordance with the above mentioned process, the resin to be used is subjected to a certain chemical pretreatment. It has been found that the presence of free ammonia in the finished products is not noticed, if the hardening or non-hardening resin be partially or entirely esterified. The process is preferably carried out in the manner as described hereinafter.

The resin to be used, for instance a phenol-formaldehyde resin, is boiled with a fraction of its weight of acetic anhydride, thereby causing a partial esterification of the resin. The partially esterified resin is, as usual, worked upon the calender, under heat, into a molding mixture by adding hexa, fillers, and other additions. The articles produced from said mixture, by way of hot-molding, do not indicate the presence of free ammonia.

Example 1.—500 parts by weight of a phenol-formaldehyde resin composed of 400 parts of phenol, 300 parts of a 40% aqueous formaldehyde and 2 parts of a 10% muriatic acid, are boiled with 150 parts of acetic anhydride on the return condenser. After 2 hours or even earlier, the acetic acid formed is distilled off. The procedure followed may also be such that the resin and the anhydride are boiled, but not distilled. In this instance, the reaction product is preferably mixed up to its neutralization point with alumina, lime, magnesium oxide or zinc oxide.

Example 2.—700 parts of the novolak as mentioned in Example 1 are mixed with 180 parts of acetic anhydride; the mixture is then boiled in a copper apparatus with a reflux condenser, followed by adding 40 parts of magnesium oxide, and finally converting the entire mixture by an agitator which conversion requires 1½ hours while maintaining the mass at 120°.

In order to obtain a molding material, equal parts by weight of the resin according to Examples 1 or 2 and of a filler, for instance wood flour, are mixed in compliance with the usual operating steps, by adding 7 to 10% of a hardening agent, for instance hexamethylenetetramine. During the production of moldings from these molding substances, it will be noted that the molded products require a longer time period within which to become hardened. However, this hardening may be accelerated by adding certain catalyzers, for instance small amounts of acids. These catalyzers are, by way of example, mixed with dry wood flour, this being effected prior to its subjection to a mixing process with the resin.

Example 3.—A resin capable of being hardened is produced from 100 parts by weight of commercial cresol, 90 parts of aqueous formaldehyde 40%, and 3 parts of an aqueous ammonia solution, specific gravity 0.91. 500 parts by weight of this resin are treated with 120 parts of acetic anhydride, like in Example 1. The resin thus obtained is used as a binder for making moldings by hot-pressure, adding hexamethylenetetramine as a hardening accelerator.

According to the present invention, the presence of free ammonia in the molding material or in the molded products is overcome by starting out from resin-like binders which are partially or complete esterified. However, it has further been found that the intended effect may also be accomplished by adding ester to the non-hardening resin; this is obtained prior to its being acted upon by the hardening agent. It is, for instance, possible to add ethyl-oxalate to the unchanged or partially esterified artificial resin binder. Further an artificial resin binder may be partially or wholly esterified, and the product thus obtainable may be used in connection with an unaltered artificial resin.

Example 4.—The treatment as in Example 1, however, only half of the acetic anhydride is used, adding 60 parts of ethyl oxalate subsequent to the distilling off of the acetic acid.

Example 5.—The same operation as in Example 2, with the addition of using the double amount of anhydride, adding 700 parts of unchanged novolak after a complete acetylization, and finally neutralizing with 40-60 parts of zinc oxide.

If a molding made of the described molding material is tested for free ammonia, it will be noted that no ammonia development is to be observed, even under the most severe tests, whereas, for instance, it is easily possible to prove the presence of ammonia in moldings which have been made in accordance with known processes.

In carrying out the invention, any novolaks as well as any resols may be used. For instance, hardening or non-hardening resins from phenol or cresol and hexamethylenetetramine, or from phenols, formaldehyde and suitable catalyzer may be employed. The selection of the phenols, aldehydes and the catalyzers, therefore, may be optional. The process is not only applicable to phenol resins, but generally to resins which are used for hardening or as hardening accelerators by adding hexa or other substances yielding ammonia or amines of aliphatic or aromatic nature. As esterification agents, preferably acid anhydrides or acid chloride are used, their amount being preferably between $\frac{1}{10}$ and an entire chemical equivalent of the resin molecule. On the esterification, catalyzers, for instance acids may be applied in small amounts. The neutralization of the acid formed during esterification is most advisible, yet not imperative. As neutralizing agents, preferably inorganic compounds, for instance those already mentioned, are used. However, they may partially or entirely be replaced by organic bases, for instance anilin. The neutralizing agents may also be used in excess, providing they do not interfere with the further treatment.

The hardenable or non-hardenable resins are mixed with the other ingredients in the before described manner, preferably in the heat, for example on heated mixing rollers or in heated kneading machines.

We claim:

1. Process of preparing a moldable composition from a phenol-aldehyde resin that is hardenable in a mold under the action of heat and pressure without detectable free ammonia in the molded article when hexamethylenetetramine is included as a hardening agent which comprises modifying the resin to a partial extent at least by esterification of the resin by a member of the group of acid anhydrides and acid chlorides, and mixing the ester-modified resin with a filler and with hexamethylenetetramine to act as a hardening agent for the resin in a molding operation.

2. Process of preparing a moldable composition from a phenol-aldehyde resin that is hardenable in a mold under the action of heat and pressure without detectable free ammonia in the molded article when hexamethylenetetramine is included as a hardening agent which comprises modifying the resin to a partial extent at least by esterification of the resin by acetic anhydride and mixing the ester-modified resin with a filler and with hexamethylenetetramine to act as the hardening agent for the resin in a molding operation.

3. Process of preparing a moldable composition from a phenol-aldehyde resin that is hardenable in a mold under the action of heat and pressure without detectable free ammonia in the molded article when hexamethylenetetramine is included as a hardening agent which comprises modifying the resin to a partial extent at least by esterification of the resin by a member of the group of acid anhydrides and acid chlorides, neutralizing the acid formed, and mixing the ester-modified resin with a filler and with hexamethylenetetramine to act as a hardening agent for the resin in a molding operation.

4. Moldable composition hardenable in a mold under the action of heat and pressure without detectable ammonia in the molded article when hexamethylenetetramine is included as a hardening agent comprising a phenol-aldehyde resin modified to a partial extent at least by esterification by a member of the group of acid anhydrides and acid chlorides in admixture with a filler and hexamethylenetetramine.

5. Process of preparing a moldable composition from a phenol-aldehyde resin that is hardenable in a mold under the action of heat and pressure without detectable free ammonia in the molded article when hexamethylenetetramine is included as a hardening agent for the resin which comprises acetylation to a partial extent at least, and mixing the acetylated resin with a filler and with hexamethylenetetramine to act as a hardening agent for the resin in a molding operation.

6. Moldable composition hardenable in a mold under the action of heat and pressure without detectable free ammonia in the molded article when hexamethylenetetramine is included as a hardening agent comprising a phenol-aldehyde resin acetylated to a partial extent at least in admixture with a filler and hexamethylenetetramine.

ERNST ELBEL.
FRITZ SEEBACH.